United States Patent [19]
Ryu et al.

[11] Patent Number: 5,481,692
[45] Date of Patent: Jan. 2, 1996

[54] COMPUTING SYSTEM FOR DATA PROCESSING APPARATUS

[75] Inventors: Tadamitsu Ryu, Yokohama; Toshio Takahara, Kawasaki; Shingo Hirono, Tokyo; Tohru Matsumoto, Yokohama, all of Japan

[73] Assignee: Fujitsu Limited, Kawasaki, Japan

[21] Appl. No.: 151,044

[22] Filed: Nov. 12, 1993

Related U.S. Application Data

[63] Continuation of Ser. No. 596,332, Oct. 12, 1990, abandoned.

[30] Foreign Application Priority Data

Oct. 12, 1989 [JP] Japan .................................. 1-265570

[51] Int. Cl.$^6$ ..................................................... G06F 12/00
[52] U.S. Cl. ........................ 395/700; 395/600; 364/222; 364/258.4; 364/261.2; 364/283.1; 364/DIG. 1
[58] Field of Search .................................. 395/375, 600, 395/425

[56] References Cited

U.S. PATENT DOCUMENTS

| | | | |
|---|---|---|---|
| 4,740,886 | 4/1988 | Tanifuji et al. | 364/150 |
| 4,794,553 | 12/1988 | Watanabe et al. | 364/710.01 |
| 5,033,009 | 7/1991 | Dubnoff | 395/148 |

FOREIGN PATENT DOCUMENTS 0336586  3/1989  European Pat. Off. .

OTHER PUBLICATIONS

K. Parsaye, M. Chignell, S. Khoshafian, H. Wong, "Intelligent Databases, Object—Oriented, Deductive Hypermedia Technologies", pp. 35–159.

S. Hanata et al., "Conversational Database Query Language," Review of Electrical Communication Laboratories, vol. 29, Nos. 1—1, Jan.–Feb. 1981, pp. 32–50.

Production Program Generation in a Flexible Data Dictionary System, IEEE Proceedings, 6th Int'l. Conference n Very Large Data Based, Oct. 1–3, 1980, pp. 343–349.

*Primary Examiner*—Kevin J. Teska
*Assistant Examiner*—Ayni Mohamed
*Attorney, Agent, or Firm*—Staas & Halsey

[57] ABSTRACT

A computing system for a data processing apparatus which carries out data processing using a formula. The system includes a link data file for storing formulas which are described by command names assigned to data elements and operation symbols which define operation between the command names, an actual data file for storing actual data in correspondence with the command names in the formulas managed by the link data file, and a computing file for operation processes for computing the operation contents of the operation symbols in the formulas managed by the link data file. A process is provided for specifying a requested formula which is to be computed by referring to the link data file in response to a computation request, reading from the actual data file the actual data corresponding to the command names in the specified formula and reading from the computing file the operation processes corresponding to the operation symbols in the specified formula, and carrying out operations of the operation processes read from the computing file with respect to the actual data read from the actual data file.

9 Claims, 6 Drawing Sheets

5,481,692

COMPUTING SYSTEM FOR DATA PROCESSING APPARATUS

This application is a continuation of application Ser. No. 07/596,332, filed Oct. 12, 1990, now abandoned.

BACKGROUND OF THE INVENTION

1. Field of the Invention

The present invention generally relates to computing systems, and more particularly to a computing system for a data processing apparatus that is designed to be flexible when modifying a formula used for computation during data processing.

2. Description of the Related Art

In a conventional data processing apparatus, computations using various formulas are made when carrying out data processing. The formulas used for the computations are not fixed, and normally, the formulas are successively modified depending on the nature of the data processing. For this reason, the data processing apparatus must be designed so that various formulas can be computed when carrying out the data processing and so that the data processing apparatus can adjust to perform flexibly in response to modifications of the formulas.

In the conventional data processing apparatus, formulas required for the data processing are inserted within a data processing program and the required formulas are computed depending on the execution of the data processing program. Similarly, when carrying out a computation such as obtaining a total of a group of variables listed in a table, a formula for obtaining the total is inserted in the data processing program and the computation is carried out by executing the data processing program.

However, according to the conventional data processing apparatus, it is necessary to modify the data processing program itself when modifying the formula. The modification of the data processing program is not a large burden on the programmer when only a slight modification is made to the formula. But when a large modification to the formula is required, there is a large burden on the programmer. Therefore, there is the problem that modification of the formula greatly deteriorates the program development efficiency.

SUMMARY OF THE INVENTION

Accordingly, it is a general object of the present invention to provide a novel and useful computing system in which the problem described above is eliminated.

Another and more specific object of the present invention is to provide a computing system for a data processing apparatus which carries out data processing using a formula. This system has a link data file (formula storage) for managing (storing) formulas which are described by command names (variables) assigned to data elements and operation symbols which define an operation to be performed on the data elements corresponding to command names. An actual data file (variable data storage) is provided for managing actual data in correspondence with the command names in the formulas managed by (stored in) the link data file. A computing file (operation storage) is provided for managing computing means (operation means) for computing the operation defined by the operation symbols in the formulas in the link data file. A process (formula computation means) is provided which is connected to the link data file, the actual data file and the computing file. This processing part specifies a requested formula to be computed by referring to the link data file in response to a computation request. Then, the processing part reads from the actual data file the actual data corresponding to the command names in the specified formula and reads from the computing file the computing means corresponding to the operation symbols in the specified formula, and performs the operations of the computing means read from the computing file according to the actual data read from the actual data file. According to the computing system of the present invention, the formulas may be modified with ease without the need to rewrite the programs. Hence, it is possible to greatly improve program development efficiency. In addition, it is possible to carry out various kinds of operations because various formulas can be specified by arbitrary combinations of the computing means in the computing file.

Other objects and further features of the present invention will be apparent from the following detailed description when read in conjunction with the accompanying drawings.

DESCRIPTION OF THE PREFERRED EMBODIMENTS

Figure 1:
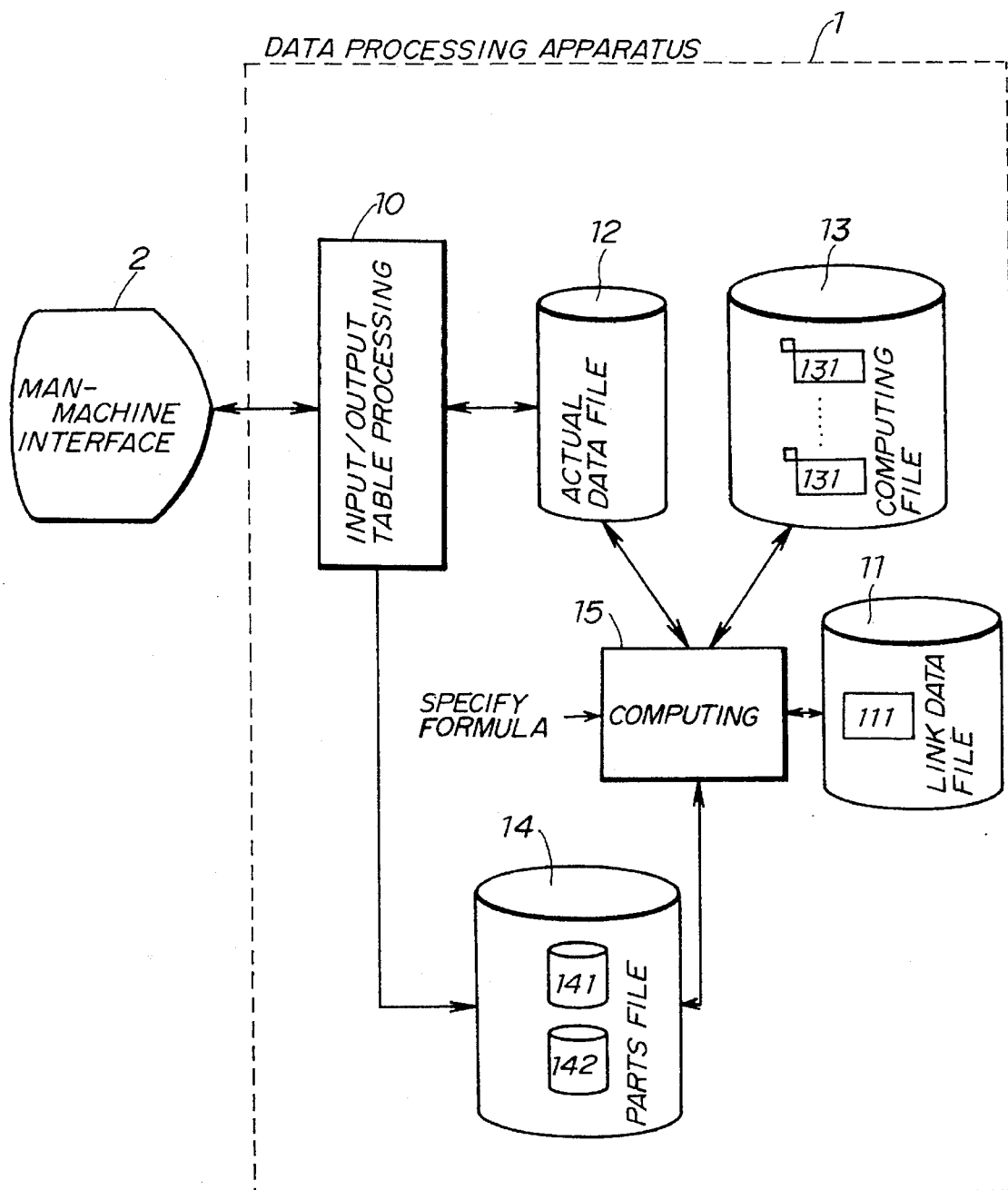
FIG. 1 is a system block diagram for explaining an operating principle of a computing system according to the present invention.

First, a description will be given of an operating principle of a computing system according to the present invention, by referring to FIG. 1. FIG. 1 generally shows a data processing apparatus 1 which is coupled to a man-machine interface 2. The data processing apparatus 1 includes an input/output table process 10, a link data file 11, an actual data file 12, a computing file 13, a parts file 14, and a computing process, or part 15 which are coupled as shown.

The input/output table processing part 10 controls input/output of information between the man-machine interface 2 and the data processing apparatus 1. The link data file 11 stores, or manages operation identifying, or operation sensors 111 which include formulas described by "command names" and "operation symbols". The command names (variables) are assigned to data elements which are stored as "parts", and the operation symbols define contents of the operation or computation located between the command names in the formula, and to be performed on the data elements corresponding to those command names. The actual data file 12 stores actual data which are assigned to the command names within the operation sensors 111 managed by the link data file 11.

The computing file 13 manages a plurality of operation processes, or computing means 131 for processing the operation contents of the operation symbols within the operation sensors 111 which are managed by the link data file 11. The parts file 14 manages data identifiers, or soft sensors 141 and link identifiers, or link sensors 142. The soft sensors 141 manage attribute information such as the names, keywords and command names of the parts stored in the actual data file 12 in a language or format easily understood by the operator. The link sensors 142 store attribute information such as the names, keywords and command names of operation sensors 111 stored in the link data file 11 in a language or format easily understood by the operator.

The computing part 15 refers to the link data file 11 and selects a requested formula when there is a request to compute this requested formula. In addition, the computing part 15 reads from the actual data file 12 actual data corresponding to the command names in the specified formula. Furthermore, the computing part 15 reads out from the computing file 13 the operation processes, or computing means 131 which correspond to the operation symbols within the specified formula. Hence, the computing part 15 carries out the computation of the requested formula based on the actual data from the actual data file 12 and the computing means 131 from the computing file 13.

According to the present invention, the formulas which are required to carry out the data processing are described both by the command names assigned to the data elements which are managed as parts, and by the operation symbols which define the operation contents of the operation or computation between the command names. The command names which are assigned to the parts (file data described as parts) describe the attribute information related to the parts. The following is an example of a formula described by the command names and operation symbols.

$$X = S1 + S2 + S3$$

As described above, the link data file 11 stores the formulas as the operation identifiers, or operation sensors 111. Hence, in this case, the link data file 11 manages the following, where "XS1" denotes a command which is assigned to the operation sensor 111.
"Operation Sensor 111"
≡XS1
≡X, =, S1, +, S2, +, S3, In this case, the actual data of the command names X, S1, S2 and S3 are managed by the actual data file 12. In addition, the computing means 131 for processing the operation contents of the operation symbols "=" and "+" are managed by the computing file 13. The link sensor 142 of the parts file 14 manages the command XS1 in correspondence with a corresponding name such that the operator can easily relate this name to the command XS1.

For example, when a computation request is made from the man-machine interface 2 by specifying the part name of the operation sensor 111, the computing part 15 specifies the command name of the requested operation sensor 111 by referring to the link sensors 142 of the parts file 14. By this process, the command XS1 is specified in the above described case. Next, the computing part 15 makes a search in the link data file 11 depending on the specified command name, and obtains the corresponding operation sensor 111 so as to specify the requested formula to be computed.

When the requested formula to be computed is specified, the computing part 15 reads from the actual data file 12 the actual data corresponding to the command names in the specified formula. In addition, the computing part 15 reads from the computing file 13 the computing means 131 corresponding to the operation symbols in the specified formula. The computing part 15 computes the specified formula by carrying out operations on the actual data by the operation processes, or computing means 131 read from the computing file 13.

Accordingly, the present invention describes the formulas by an abstraction and manages the formulas independently of the data groups which are used in the formulas. In addition, the formulas and the data groups are linked so that the computation is carried out in an object-oriented manner. For this reason, even when a formula is to be modified, it is simply necessary to modify the associated links and there is no need to rewrite the program as in the conventional case. Therefore, it is possible to considerably improve program development efficiency.

Figure 2:
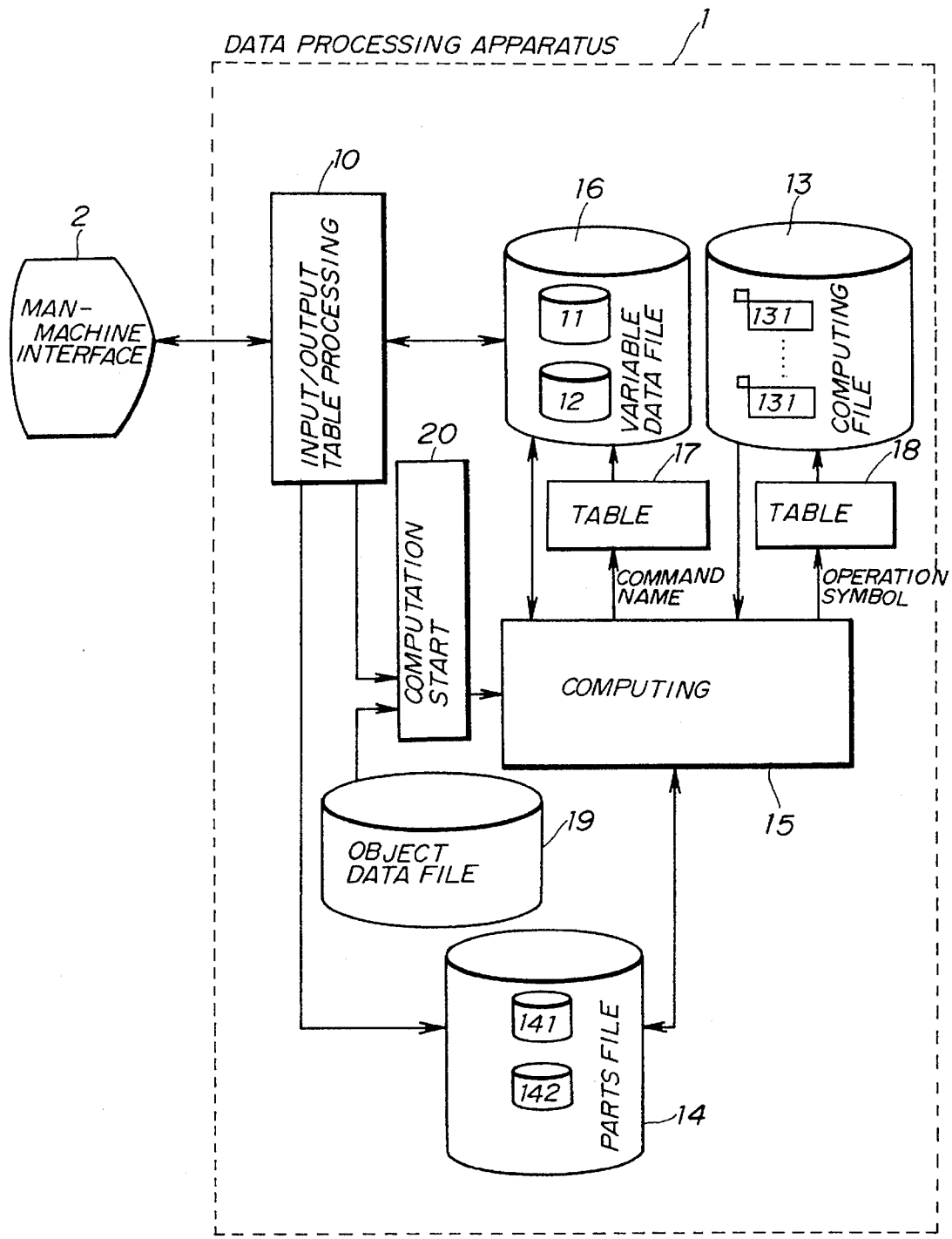
FIG. 2 is a system block diagram showing an embodiment of the computing system according to the present invention.

Next, a description will be given of an embodiment of the computing system according to the present invention, by referring to FIG. 2. In FIG. 2, those parts which are the same as those corresponding parts in FIG. 1 are designated by the same reference numerals, and a description thereof will be omitted.

A variable data file 16 corresponds to the link data file 11 and the actual data file 12 shown in FIG. 1. A parts realization table 17 manages stores, or the corresponding relationships of the command names which are stored, or managed by the parts file 14 and the storage addresses (address locations) of the command names in the variable data file 16. An operation symbols realization table 18 manages the corresponding relationships of the operation symbols in the formulas and the storage addresses of the computing means 131 corresponding to the operation symbols. An object data file 19 manages program addresses of application programs, for example, and manages the programs which carry out the computation requests. A computation start process 20 starts the computing part 15 when there is a computation request from the man-machine interface 2 or when there is a computation request from a program specified by the object data file 19.

The computing file 13 stores the operation processes, or computing means 131. These computing means carry out various basic operations such as addition, subtraction, multiplication and division. The computing file 13 also stores auxiliary computing functions which are essential when carrying out the computation. The computing means 131 are programmed in advance and stored in the computing file 13. The table 18 manages the corresponding relationships of the storage addresses of the computing means 131 and the operation symbols for identifying the operation such as "+", so that the required computing means 131 can be read from the computing file 13. Of course, the operation symbols may also be treated as commands.

Figure 3:
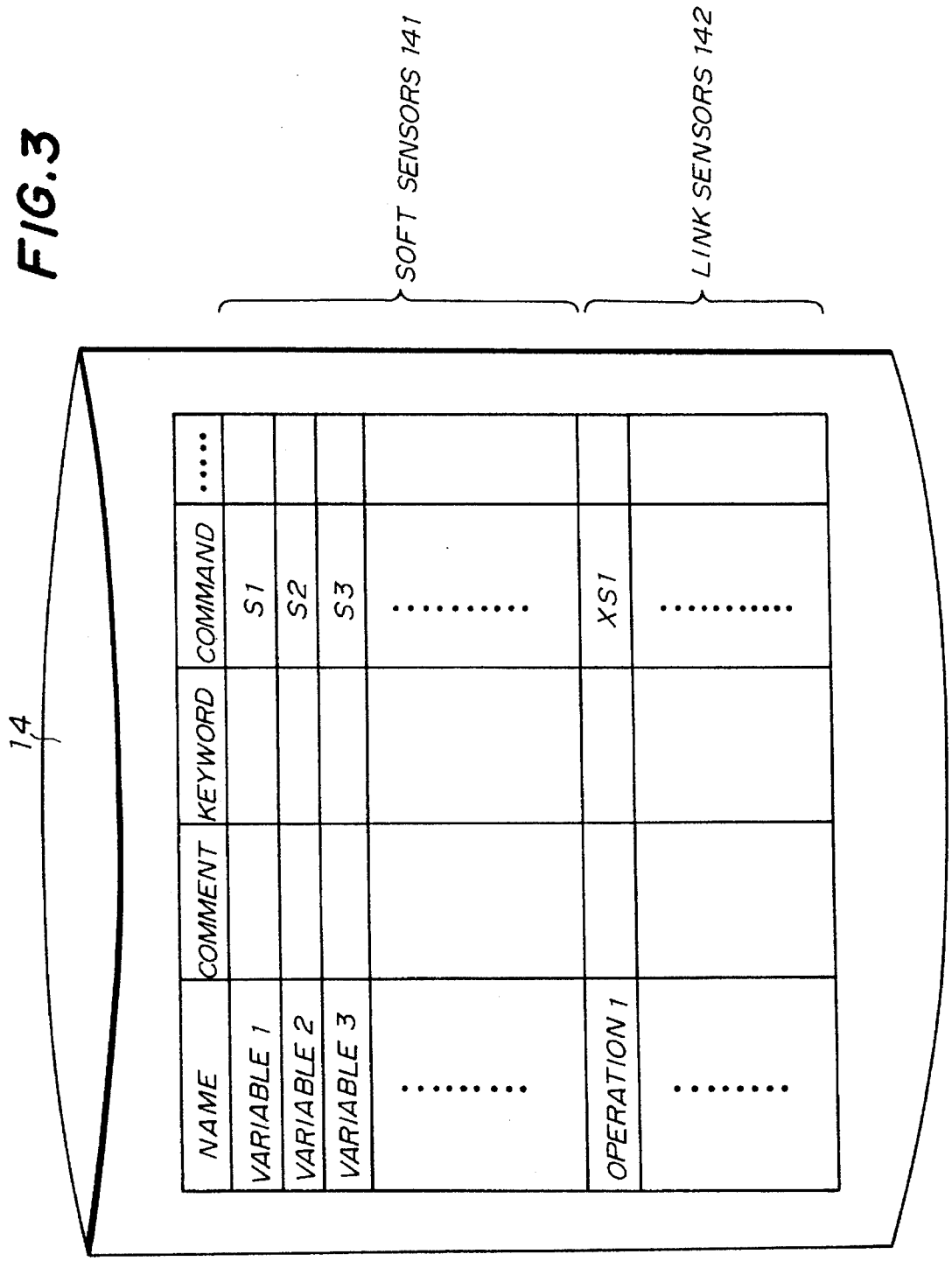
FIG. 3 is a diagram showing an embodiment of management data of a parts file.

FIG. 3 shows an embodiment of the data managed by the parts file 14, that is, the management data of the parts file 14. It is assumed in FIG. 3 that the formula which is to be computed is X=S1+S2+S3. As shown in FIG. 3, the soft sensors 141 of the parts file 14 are designed to manage the attribute information such as the names, keywords and command names of parts stored in the actual data file 12 of the variable data file 16. In addition, the link sensors 142 of the parts file 14 are designed to manage the attribute information such as the names, keywords and command names of the operation sensors 111 stored in the link data file 11 of the variable data file 16. The process of registering the management data of the parts file 14 is carried out via the input/output table processing part 10 depending on a registration instruction from the operator using a menu, for example. The attribute information such as the processes of the data of the parts, is assigned by the command names of the parts file 14.

FIG. 3 also shows "comment" and "keyword" which may be registered in correspondence with the "name" such as "variable 1" and "operation 1" so as to help the operator in identifying the various "commands" such as "S1" and "XS1".

Figure 4:
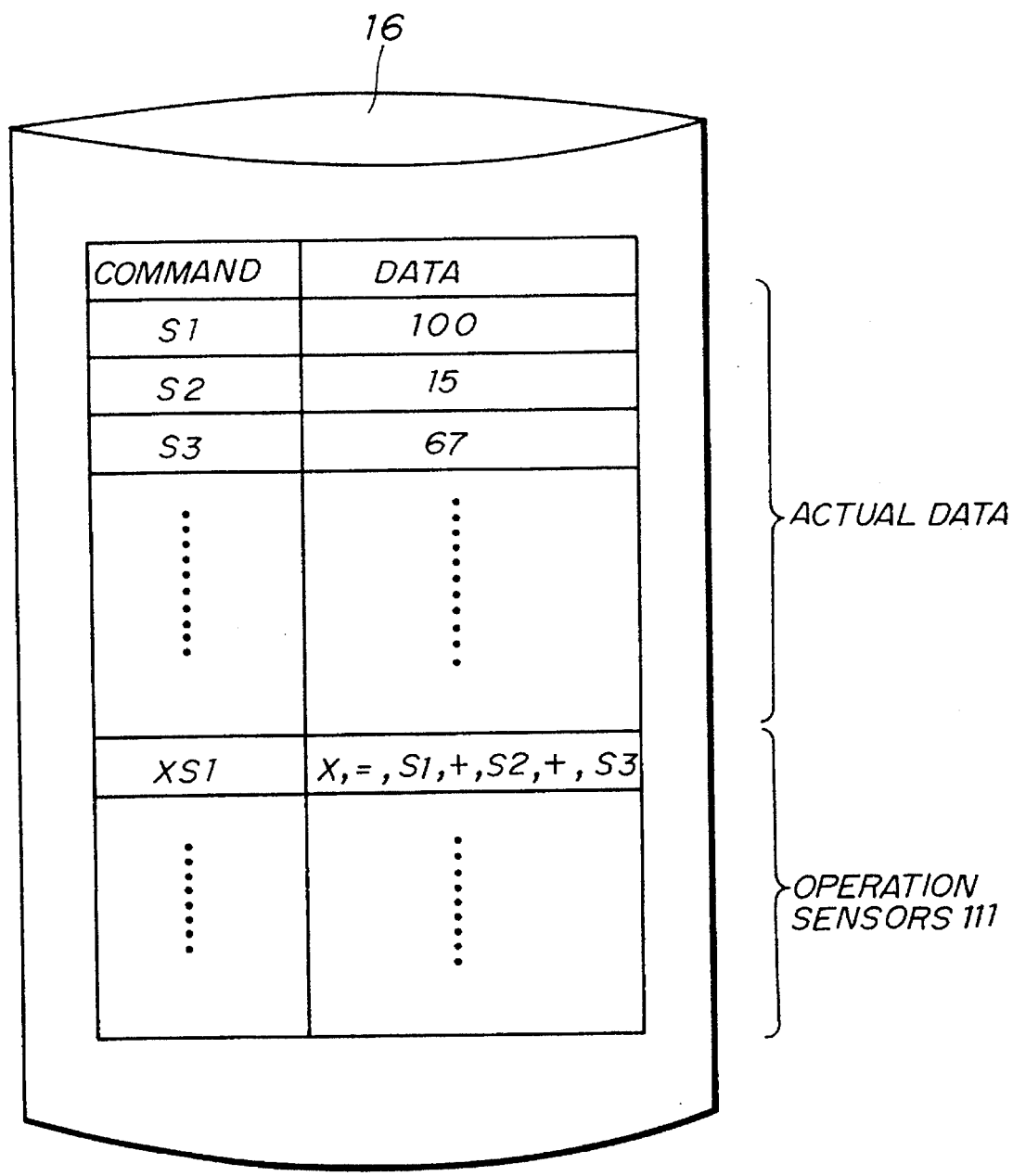
FIG. 4 is a diagram showing an embodiment of management data of a variable data file.

FIG. 4 shows an embodiment of the data managed by the variable data file 16, that is, the management data of the variable data file 16 in correspondence with the management data of the parts file 14. Actually, the table 17 manages the corresponding relationships of the command names and the storage addresses. However, in order to facilitate the understanding of the management data of the variable data file 16, this embodiment shows the management data of the variable data file 16 using the command names as keys. As shown in FIG. 4, the variable data file 16 manages the actual data corresponding to the command names of the soft sensors 141 in the parts file 14 and the operation sensor XS1≡X, =, S1, + ,S2, +, S3, corresponding to the operation sensor command XS1 of the link sensor 142 in the parts file 14. The process of registering the management data of the variable data file 16 is also carried out via the input/output table processing part 10 depending on a registration instruction from the operator using a menu, for example.

Next, a description will be given of an operation of the computing part 15 by referring to a flow chart of FIG. 5.

Figure 5:
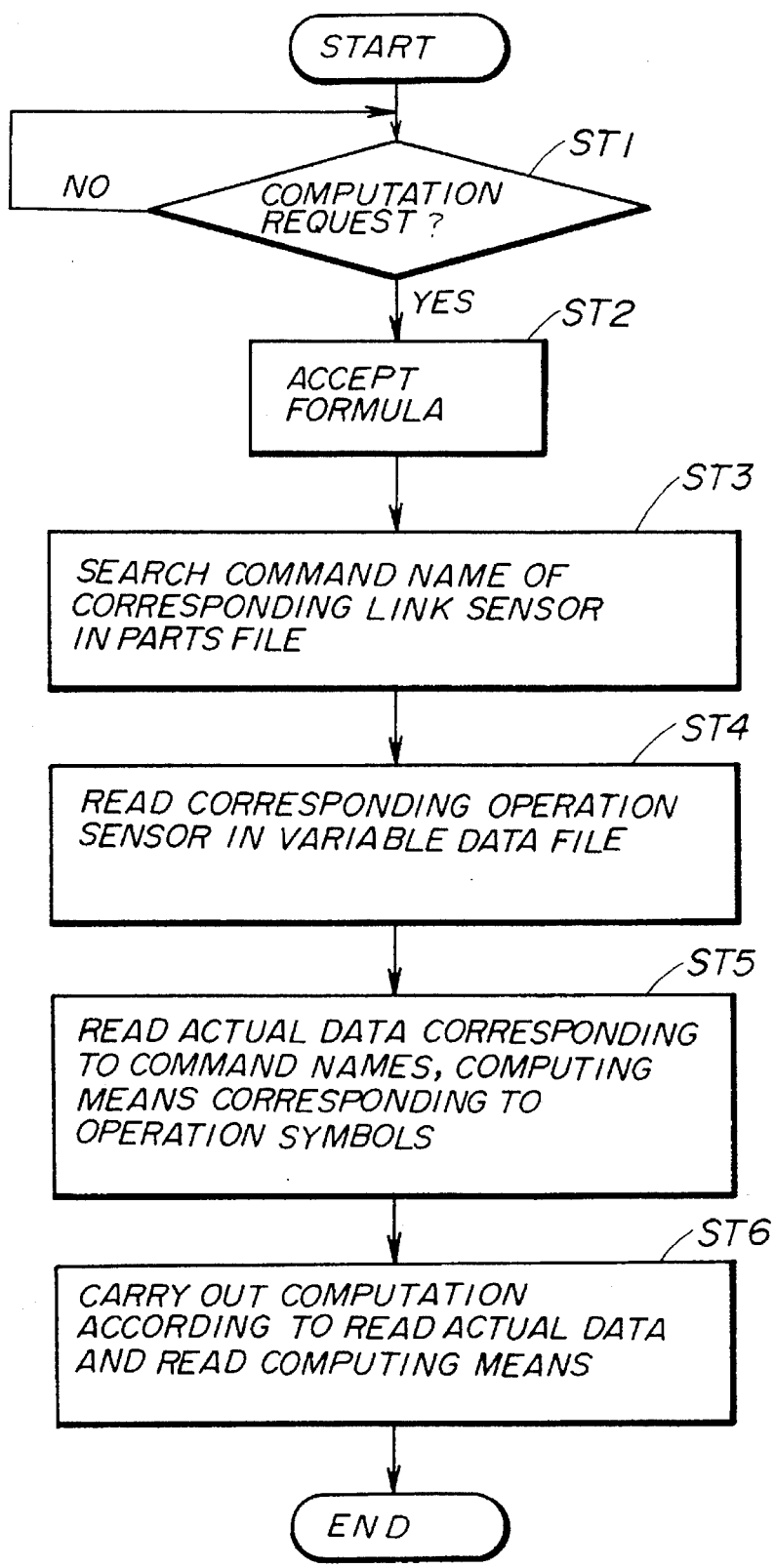
FIG. 5 is a flow chart for explaining an operation of a computing part of the embodiment of the computing system.

In FIG. 5, in step ST1 the computing part determines whether or not a computation request to compute a formula is received at the computation start part 20. When the result of step ST1 is YES, in step ST2 the computing part accepts the formula which is requested by the operator or requested by a program specified by the object data file 19. When the formula is requested by the operator, the formula is specified by specifying the part name of the link sensor 142 of the parts file 14. On the other hand, when the formula is requested by the program specified by the object data file 19, the formula is specified by directly specifying the command name of the operation sensor 111.

When the formula is accepted, a step ST3 searches for the command name of the corresponding link sensor 142 by referring to the parts file 14. For example, when the formula which is specified has the part name "operation 1" in FIG. 3, the computing part in step ST3 makes a search for the command XS1. But when the formula is requested by the program which is specified by the object data file 19, the step ST3 is omitted because the command XS1 is specified directly in this case.

In step ST4, the computing part refers to the variable data file 16 via the table 17 and reads the operation sensor 111 corresponding to the command name of the link sensor 142 which is found in the step ST3. In the case described above, the step ST4 reads the operation sensor 111 which is assigned to the command XS1, that is, X, =, S1, +, S2, +, S3,.

After the specified formula is read, the computing part in step ST5 makes a search in the actual data file 12 via the table 17, so as to read the actual data corresponding to the command names in the read specified formula. In addition, the computing part in step ST5 makes a search in the computing file 13 via the table 18, so as to read the computing means 131 corresponding to the operation symbols in the read specified formula.

In step ST6, the computing part carries out the operation of the read computing means 131 with respect to the read actual data. In other words, in the case described above, the actual data of the command S1 and the actual data of the command S2 are first added by the computing means 131 of the operation symbol "+", so as to obtain a first added value. Then, this first added value and the actual data of the command S3 are added by the computing means 131 of the operation symbol "+", so as to obtain a second added value. Next, this second added value is stored in the storage area of the variable X in the actual data file 12 by the computing means 131 for the operation symbol "=". For example, the result of this computation is displayed on a display screen of the man-machine interface 2 via the input/output table processing part 10. Of course, the result of the computation may be notified to the program which is specified by the object data file 19.

When modifying the formula to X=S1+S2+S3+S4, for example, the operation sensor 111 is modified according to this modified formula, and the actual data of the added command S4 is registered in the actual data file 12. Furthermore, the storage address of the added command S4 is registered in the table 17. In other words, the formula can be modified without the need to modify the program as in the conventional case. Of course, the modification of the command for modifying the formula may include any of addition, deletion and change of registered command in any combination.

In the embodiment described above, the data processing apparatus 1 may be made up of a central processing unit (CPU) and one or a plurality of memory units. In this case, the CPU carries out the functions of the input/output table processing part 10, the computing part 15 and the computation start part 20 shown in FIG. 2. The one or a plurality of memory units are used as the files 13, 14, 16 and 19 and the table 17 and 18.

Next, a description will be given of an operation of the CPU described above when modifying the formula, by referring to a flow chart of FIG. 6.

Figure 6:
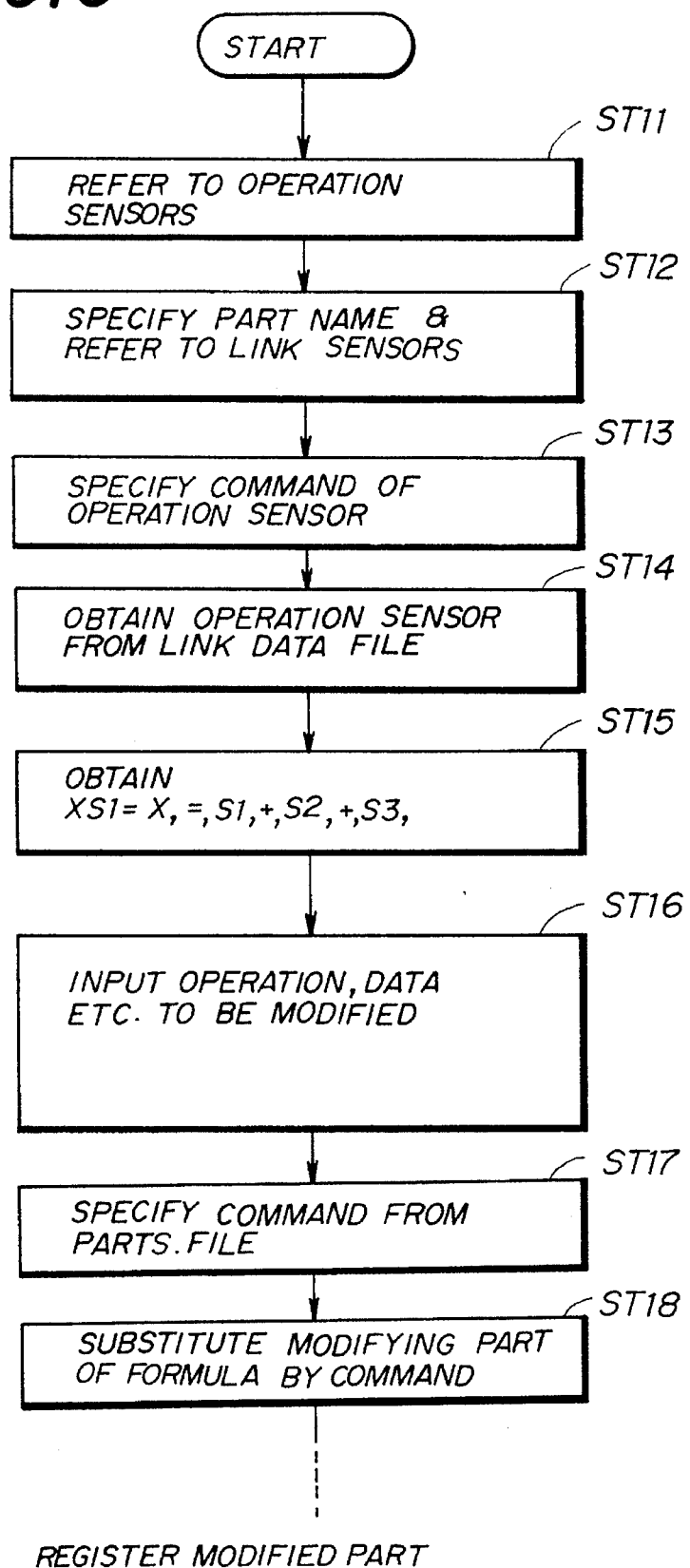
FIG. 6 is a flow chart for explaining an operation of a CPU of the computing system when modifying a formula in the embodiment of the computing system.

In FIG. 6, steps ST11 through ST13 are carried out by the CPU to find an operation sensor 111 which is to be modified. In step ST11 the CPU accesses to the operation sensors 111 in the variable data file 16. In step ST12 the CPU specifies the part name and refers to the link sensors 142 of the parts file 14. In step ST13 the CPU specifies the command of the operation sensor 111. As a result, the command XS1 is specified, for example.

In step ST14 the CPU obtains the operation sensor 111 from the link data file 11 in accordance with the command XS1. Hence, the formula is specified, and in step ST15 the CPU obtains the operation sensor XS1≡X, =, S1, +, S2, +, S3,.

In step ST16 the CPU inputs the operation, data and the like to be modified in the formula by selecting the soft sensor 141, the computing means 131 and the like, which are to be modified from the parts file 14. For example, a real number 4 is selected. In step ST17 the CPU specifies the command from the parts file 14. In this case, S4 is specified from the real number 4. In step ST18 the CPU substitutes the part of the formula to be modified with the command. In other words, S2 is substituted for S4 in XS1≡X, =, S1, +, S2, +, S3, so as to obtain XS1≡X, =, S1, +, S4, +, S3,. Thereafter, the modified part is registered in a sequence substantially in reverse of that of specifying the formula as described above. Accordingly, the operation sensor 111 itself can be modified by modifying the parts.

Further, the present invention is not limited to these embodiments, but various variations and modifications may be made without departing from the scope of the present invention.

What is claimed is:

1. A computing system, using a computer, for a data processing apparatus which performs data processing using a formula, said computing system comprising:

a storage device, including:
 a link data file prestoring a plurality of formulas which are described by command names assigned to data elements and operation symbols which define operation contents between the command names;

an actual data file managing actual data corresponding to the command names in the formulas stored by said link data file; and a computing file managing computing processes for computing the operation contents of the operation symbols in the formulas managed by said link data file;

processing means coupled to and for processing said link data file, said actual data file and said computing file, and including:

first means for specifying a requested formula to be computed by referring to said link data file in response to a computation request;

second means for reading from said actual data file the actual data corresponding to the command names in the specified formula and reading from said computing file the computing processes corresponding to the operation symbols in the specified formula; and third means for performing the computing processes read from said computing file using the actual data read from said actual data file; and a parts file, operatively connected to said processing means, for managing first attribute information of the formulas stored in said link data file and second attribute information of the actual data stored in said actual data file using predetermined names respectively assigned to the first and second attribute information for user identification, said first attribute information including the command names stored in said link data file, said second attribute information including the command names stored in said actual data file.

2. The computing system as claimed in claim 1, wherein said processing part receives the computation request via said parts file.

3. The computing system as claimed in claim 1, further comprising a table coupled to said processing means, and storing corresponding relationships of the command names stored in the parts file and storage addresses of the command names in said link data file and said actual data file.

4. The computing system as claimed in claim 1, further comprising a table coupled to said processing means for storing corresponding relationships of the operation symbols in the formulas stored in said link data file and storage addresses of the computing processes stored in said computing file and correspond to the operation symbols.

5. The computing system as claimed in claim 1, further comprising an object data file, coupled to said processing means, and managing program addresses of application programs.

6. The computing system as claimed in claim 5, wherein said processing part receives the computation request by a program specified by said object data file.

7. The computing system as claimed in claim 1, wherein the operation contents of said operation symbols include addition, subtraction, multiplication and division.

8. The computing system as claimed in claim 1, wherein said processing means includes means for modifying an arbitrary one of the formulas by modifying command names in said link data file and said actual data file.

9. The computing system as claimed in claim 1, wherein said data processing apparatus includes a central processing unit and memory unit, said central processing unit including said computing means, said memory unit including said link data file, said actual data file and said computing file.

\* \* \* \* \*

UNITED STATES PATENT AND TRADEMARK OFFICE
CERTIFICATE OF CORRECTION

PATENT NO. : 5,481,692
DATED : Jan. 2, 1996
INVENTOR(S) : RYU et al.

It is certified that error appears in the above-indentified patent and that said Letters Patent is hereby corrected as shown below:

TITLE PAGE: [56] References Cited, OTHER PUBLICATIONS:

line 2 of the third reference, change "Conference n" to --Conference on--.

[57] ABSTRACT:

line 5, change "operation" (second occurrence) to --operations--.

Col. 4, line 18, change "manages stores, or" to --stores, or manages--.

Signed and Sealed this

Second Day of July, 1996

Attest:

BRUCE LEHMAN

*Attesting Officer*   *Commissioner of Patents and Trademarks*